United States Patent
Stern

[11] Patent Number: 5,991,420
[45] Date of Patent: Nov. 23, 1999

[54] BATTERY PACK WITH AUDIO COIL

[75] Inventor: Trampas Stern, Raleigh, N.C.

[73] Assignee: Ericsson Inc., Research Triangle Park, N.C.

[21] Appl. No.: 08/757,516

[22] Filed: Nov. 27, 1996

[51] Int. Cl.[6] .............................. H04B 1/00; H04R 25/04
[52] U.S. Cl. ......................... 381/315; 381/322; 381/331; 379/52; 455/90
[58] Field of Search .................................. 455/575, 572, 455/90, 349, 351; 381/321, 322, 315, 330, 328, 331; 379/52

[56] References Cited

U.S. PATENT DOCUMENTS

| | | | |
|---|---|---|---|
| 2,530,621 | 11/1950 | Lybarger | 379/52 |
| 3,396,245 | 8/1968 | Flygstad | 379/52 |
| 3,668,334 | 6/1972 | Schwake | 381/331 |
| 3,742,359 | 6/1973 | Behymer | 381/115 |
| 4,160,122 | 7/1979 | Jacobson | 379/52 |
| 4,543,453 | 9/1985 | Brander | 381/108 |
| 4,596,899 | 6/1986 | Wojcik et al. | 179/2 C |
| 5,537,472 | 7/1996 | Estevez-Alcolado et al. | 379/433 |
| 5,796,821 | 8/1998 | Crouch et al. | 381/330 |

FOREIGN PATENT DOCUMENTS

| | | |
|---|---|---|
| 0 313 776 A2 | 5/1989 | European Pat. Off. . |
| 35 08 830 A1 | 9/1986 | Germany . |
| 2 292 287 | 2/1996 | United Kingdom . |
| PCT/US97/21930 | 4/1998 | WIPO . |

*Primary Examiner*—Willis R. Wolfe
*Assistant Examiner*—Hieu T. Vo
*Attorney, Agent, or Firm*—Jenkens & Gilchrist P.C.

[57] ABSTRACT

A battery pack is provided for use with a mobile phone. The battery pack includes audio signal power amplifier circuitry with an inductive coil. The inductive coil boosts the magnetic field strength of the audio signal received by the phone, so that a tele-coil circuit for a hearing aid can be used to pick up the audio signal received by the phone. Consequently, the picked up audio signal can be discerned from the magnetic noise created by the phone. Also, the use of the battery coil allows a tele-coil pick up of the audio signal even if the phone has a speaker that does not generate an appreciable magnetic field.

16 Claims, 3 Drawing Sheets

FIG. 1A  FIG. 1B

BATTERY PACK WITH AUDIO COIL

BACKGROUND OF THE INVENTION

1. Technical Field of the Invention

The present invention relates generally to the communications field and, in particular, to a battery for use with a mobile phone in conjunction with a hearing aid device.

2. Description of Related Art

A "tele-coil" is an inductive device that is placed near a telephone speaker and used to couple audio signals from the speaker to a hearing aid. Essentially, a pick-up coil is placed into the magnetic field of the speaker. The audio signals induced in the coil are amplified and coupled to the speaker or transducer of the hearing aid. Consequently, the tele-coil facilitates the use of telephones by people who have hearing problems.

The Hearing Aid Compatibility Act of 1988 requires all fixed and mobile telephones to be hearing aid compatible. The Federal Communications Commission (FCC) has set forth these requirements in 47 C.F.R. § 68.316, which states that the axial magnetic field generated at a telephone speaker by a −10dBV signal at 1kHz should be greater than −22dBA/m. The radial magnetic field generated at the speaker should be greater than −27dBA/m. However, although these requirements may be appropriate for fixed telephones operating in a relatively noise-free environment, they are not suitable for those environments where there is substantial noise.

For example, a mobile telephone employed in the North American Personal Communications System (PCS) can transmit at full power (½W) and generate peak axial noise of about −16dBA/m. A standard speaker used in a PCS mobile phone generates an axial magnetic field of about −17dBA/m at 80dBSPL. Consequently, the noise generated by a PCS mobile phone speaker produces a substantial amount of interference in a hearing aid that uses a tele-coil, and the tele-coil user is unable to distinguish the audio signal from the speaker-generated noise.

A different problem encountered by tele-coil users is that newer mobile phones utilize piezoelectric speakers that do not generate a magnetic field. Consequently, a tele-coil cannot be used to couple the audio signal from the speaker in such a mobile phone.

SUMMARY OF THE INVENTION

Accordingly, a battery pack is provided for use with a mobile phone. The battery pack includes audio signal power amplifier circuitry with an inductive coil. The inductive coil boosts the magnetic field strength of the audio signal received by the phone, so that a tele-coil circuit for a hearing aid can be used to pick up the audio signal received by the phone. Consequently, the picked up audio signal can be discerned from the magnetic noise created by the phone. Also, the use of the battery coil allows a tele-coil pick up of the audio signal even if the phone has a speaker that does not generate an appreciable magnetic field.

BRIEF DESCRIPTION OF THE DRAWINGS

A more complete understanding of the method and apparatus of the present invention may be had by reference to the following detailed description when taken in conjunction with the accompanying drawings wherein:

FIG. 1A–1C are diagrams that illustrate three views of a mobile phone battery that incorporates an audio coil for use with a hearing aid, in accordance with a preferred embodiment of the present invention;

DETAILED DESCRIPTION OF THE DRAWINGS

Figure 1C:
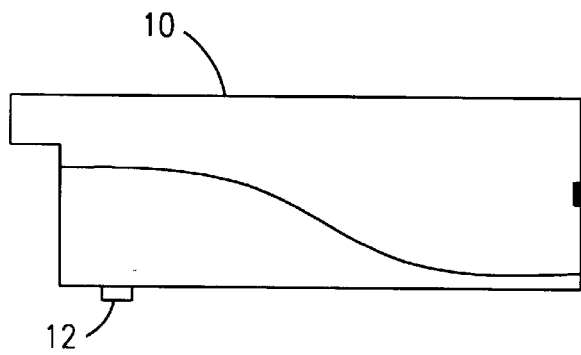
Figure 1C:
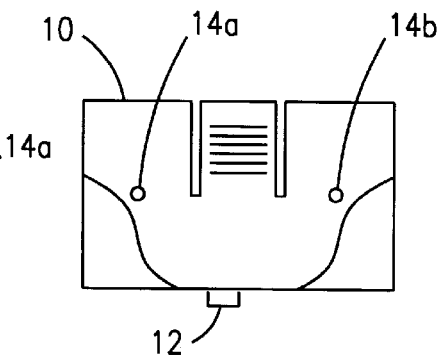
Figure 1C:
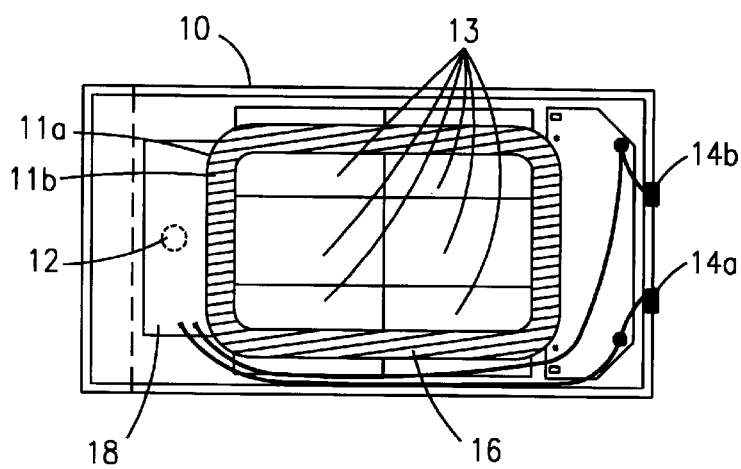
Figure 2A:
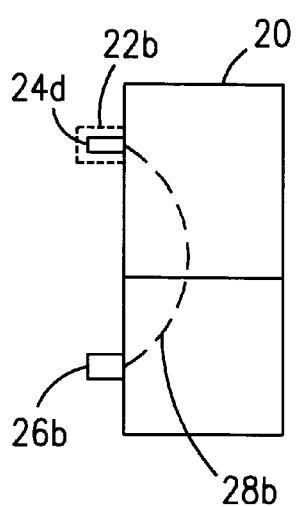
FIG. 2A and 2B are diagrams that illustrate two views of an electrical connector that can be used to couple voltages and audio signals between the battery pack shown in FIG. 1A–1C and a mobile phone, in accordance with the preferred embodiment of the present invention.
Figure 2B:
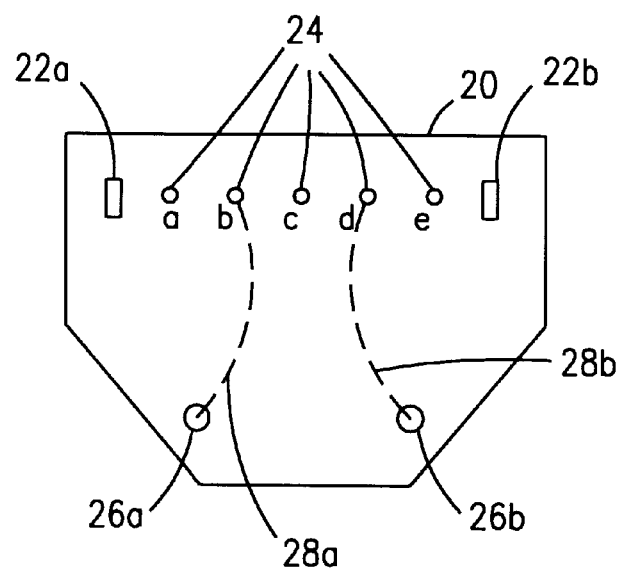
Figure 3:
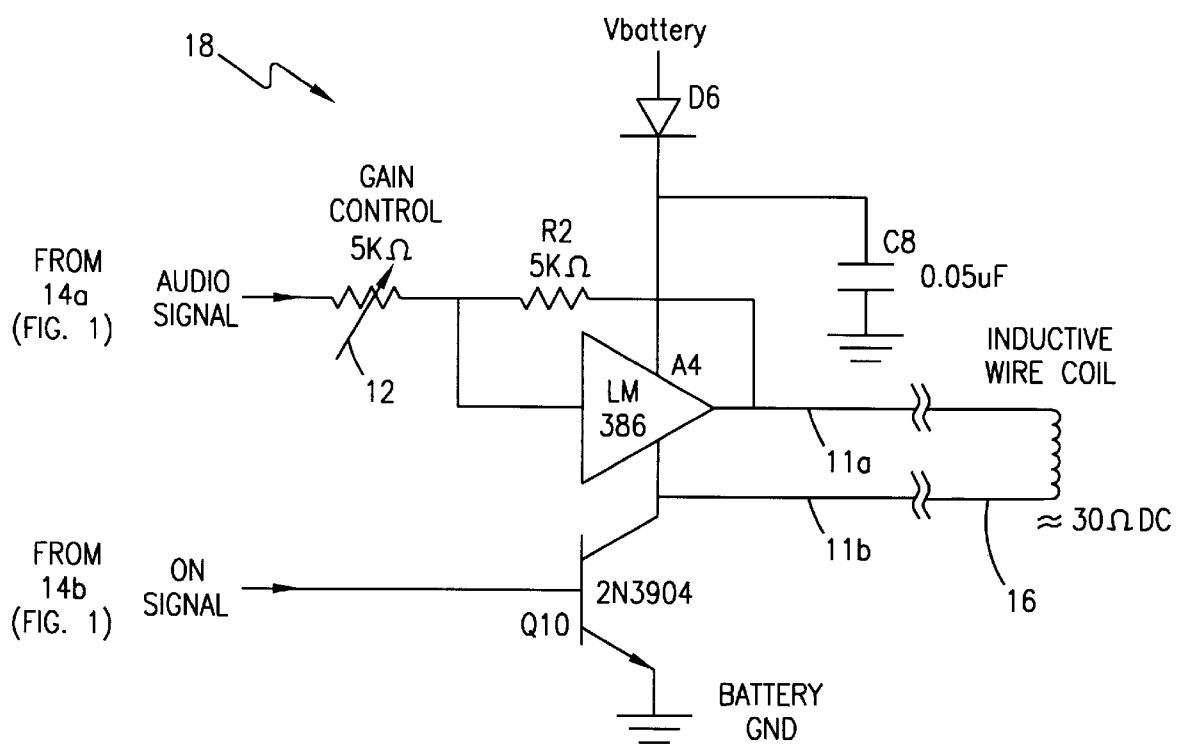
FIG. 3 is an electrical schematic diagram of an exemplary amplifier circuit, which can be used to control the signal power in the battery coil shown in FIG. 1A–1C.

The preferred embodiment of the present invention and its advantages are best understood by referring to FIGS. 1–3 of the drawings, like numerals being used for like and corresponding parts of the various drawings.

FIG. 1A–1C are diagrams that illustrate three views of a mobile phone battery that incorporates an audio coil for use with a hearing aid, in accordance with a preferred embodiment of the present invention. Referring to FIG. 1A, a side view of a battery pack 10 is shown. For this embodiment, battery pack 10 provides power for a mobile phone that is used in conjunction with a hearing aid or other similar device for amplifying audio signals. Battery pack 10 includes a pair of "pogo-pin" depressible contacts 14a and 14b, as shown in a rear view (FIG. 1B), and a gain control 12.

FIG. 1C is a top view of battery pack 10. External contacts 14a and 14b are connected to respective inputs of audio signal amplifier 18. Output connections 11a and 11b of audio signal amplifier 18 are connected to respective winding leads on insulated coil 16. Preferably, coil 16 is arranged on an upper surface of battery cells 13.

FIG. 2A and 2B are diagrams that illustrates, two views of an electrical connector 20 that can be used to couple voltages and audio signals between battery pack 10 in FIG. 1A–1C and a mobile phone (not explicitly shown), in accordance with the preferred embodiment of the present invention. For this embodiment, a plurality of "pogo pin" contacts 24 and 26 are included in connector 20. Snaps 22a and 22b are conventional snaps that can lock connector 20 to battery pack 10 and the mobile phone. Pin contacts 24a–e make electrical contact with respective mating contacts (not explicitly shown) on an end of the mobile phone. Pin contacts 24b and 24d are electrically connected by respective leads 28a and 28b to respective pin contacts 26a and 26b.

FIG. 2A is a side view of connector 20. In operation, contacts 26a and 26b mate with respective contacts 14a and 14b of battery pack 10 (oriented to the right side of FIG. 1A). FIG. 2B is a front view of connector 20.

FIG. 3 is an electrical schematic diagram of an exemplary amplifier circuit 18, which can be used to control the signal power in battery coil 16 in FIG. 1A–1C. Although specific values and components are shown in FIG. 3, these values and components are provided for illustrative purposes and not intended to limit the scope of the invention. Any appropriate amplifier circuit that performs the function of driving an audio coil such as battery coil 16 may be used. An audio signal to be magnetically amplified and coupled to a hearing aid or similar device is coupled from connector 14a to a connection of gain control resistor 12. For the embodiment shown, this audio signal is routed from the mobile phone through contact 24d, lead 28b, and contact 26b which mates with contact 14a on battery pack 10. Depending on the setting of gain control (resistor) 12, the audio signal is amplified by amplifier A4, which drives the signal power proportionally in coil 16. A control ("ON") signal can be coupled to the base of transistor Q10, which turns on the transistor and allows the amplified audio signal current to flow through coil 16. Preferably, no current flows through coil 16 in the absence of the ON control signal. The ON control signal is coupled from the phone through contact 24*b*, lead 28*a*, and contact 2*a* which mates with contact 14*b* of battery pack 10. Preferably, in operation, the battery audio coil circuitry amplifies the magnetic field that carries the audio signal by about 40 db above the magnetic noise level. Consequently, a hearing aid user will be able to hear the audio signal from the mobile phone, which is being picked up by a hearing aid tele-coil. Also, by utilizing the battery audio coil (16), a tele-coil can still be used with a phone that has a piezoelectric speaker.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A battery pack, comprising:

at least one battery cell;

amplification means for amplifying an audio signal from a mobile phone powered by said at least one battery cell; and wherein said amplification means comprises an inductive coil.

2. The battery pack according to claim 1, wherein said amplification means further comprises a gain control.

3. The battery pack according to claim 1, wherein said amplification means further comprises audio amplification circuitry operably connected to said audio signal.

4. The battery pack according to claim 1, wherein said mobile phone comprises a cellular phone.

5. The battery pack according to claim 1, wherein said mobile phone comprises a remote telephone.

6. The battery pack according to claim 1, further comprising a connector for operably linking said mobile phone and the battery pack, said connector thereby providing said audio signal to said amplification means.

7. The battery pack according to claim 6, wherein said connector is removably attached to the battery pack.

8. The battery pack according to claim 1, wherein said amplification means amplifies a magnetic field carrying said audio signal to approximately 40 db above a magnetic noise level.

9. A battery pack, comprising:

at least one battery cell;

an amplifier;

at least one contact that receives an audio signal from a mobile phone, said at least one contact in communication with said amplifier;

an inductive coil, said inductive coil in communication with said amplifier; and whereby said audio signal may be propagated from said at least one contact to said amplifier, and from said amplifier to said inductive coil.

10. The battery pack according to claim 9, wherein said amplifier includes a gain control device, which can control the amount of signal power received by said inductive coil.

11. The battery pack according to claim 9, wherein said amplifier includes an ON control.

12. The battery pack according to claim 9, wherein said mobile phone comprises a cellular phone.

13. The battery pack according to claim 9, wherein said mobile phone comprises a remote telephone.

14. The battery pack according to claim 9, further comprising a connector for providing said audio signal from said mobile phone to said at least one contact.

15. The battery pack according to claim 14, wherein said connector is removably attached to the battery pack.

16. The battery pack according to claim 9, wherein said amplifier causes said inductive coil to produce a magnetic field carrying said audio signal at approximately 40 db above a magnetic noise level.

\* \* \* \* \*

UNITED STATES PATENT AND TRADEMARK OFFICE
CERTIFICATE OF CORRECTION

PATENT NO : 5,991,420
DATED : November 23, 1999
INVENTOR(S): Trampas Stern

It is certified that error appears in the above-identified patent and that said Letters Patent are hereby corrected as shown below:

Column 2, line 35    Replace "illustrates,"
                     With --illustrate--

Column 3, line 8     Replace "contact 2a"
                     With --contact 26a--

Signed and Sealed this

Tenth Day of April, 2001

Attest:

NICHOLAS P. GODICI

Attesting Officer    Acting Director of the United States Patent and Trademark Office